United States Patent Office 2,966,013
Patented Dec. 27, 1960

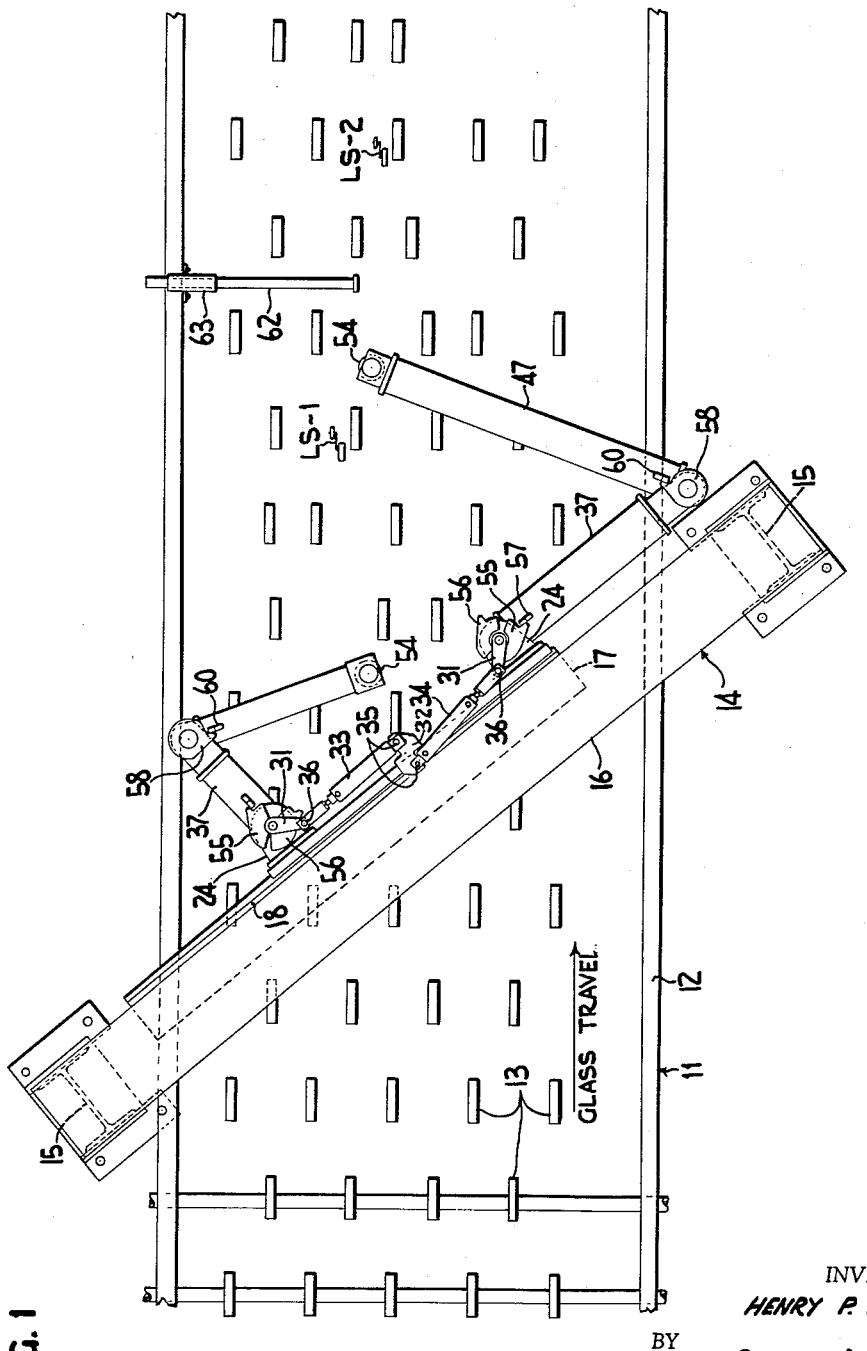

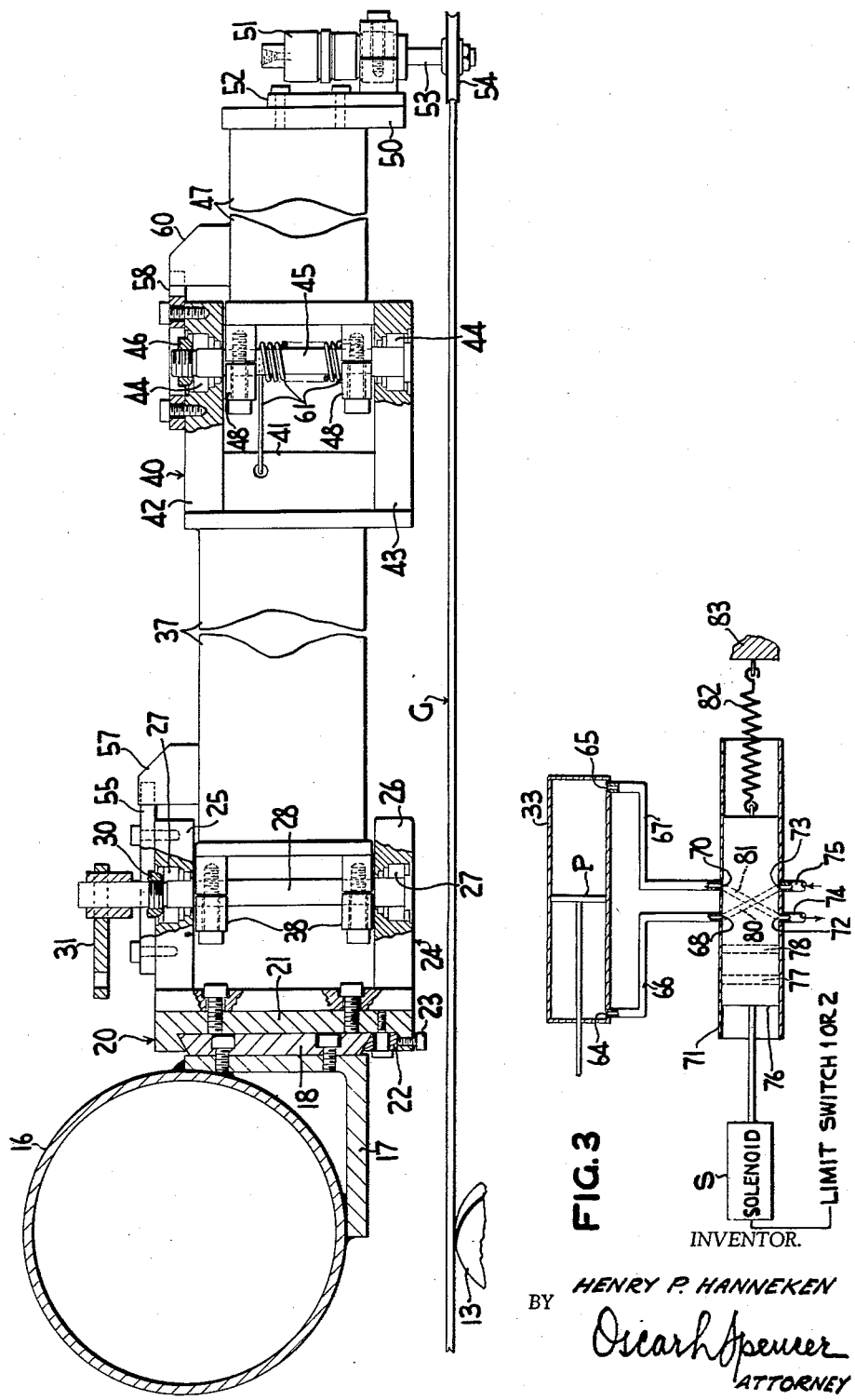

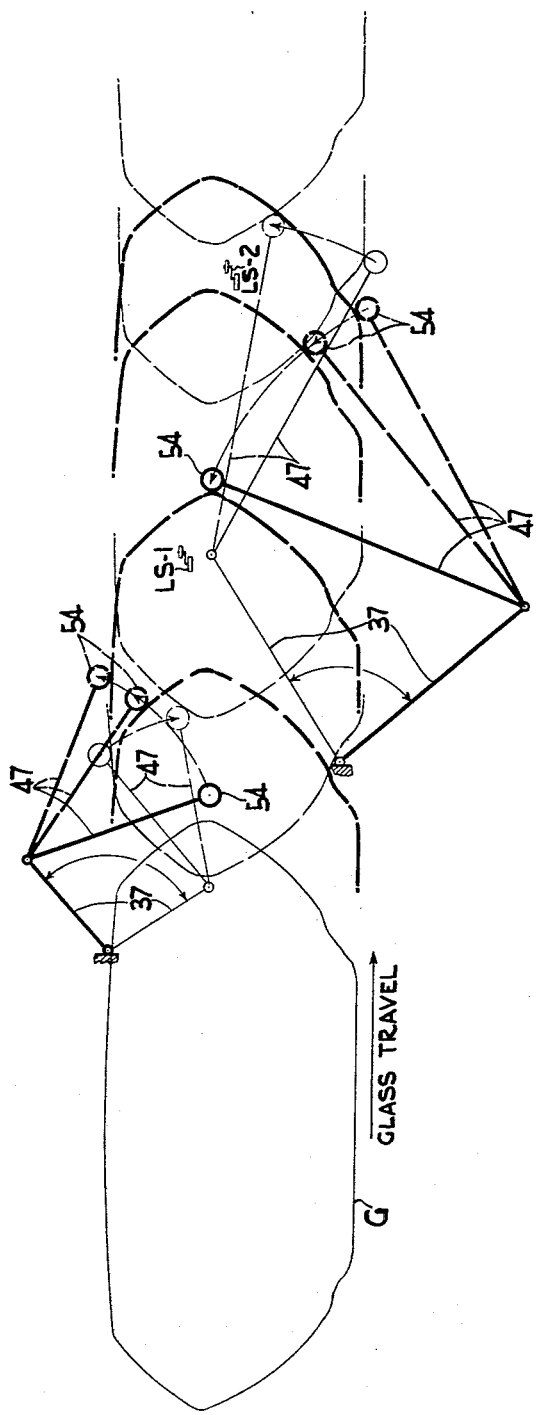

2,966,013

EDGE SEAMING APPARATUS

Henry P. Hanneken, Pittsburgh, Pa., assignor to Pittsburgh Plate Glass Company, Allegheny County, Pa., a corporation of Pennsylvania Filed July 24, 1959, Ser. No. 829,393

12 Claims. (Cl. 51—78)

This invention relates to edge seaming of glass sheets and more specifically to apparatus for seaming the peripheral edge of glass sheets precut to their desired outline.

The apparatus of this invention finds particular use in the production of lights for automobiles wherein, for example, the glass sheets are cut to a desired outline, washed, dried and then bent to a desired curvature in a bending lehr. Such sheets may, if to be used for automotive windshields, be matched in pairs for laminating into composite, glass-plastic sandwich assemblies, or may be used singly for automotive back and side slights. The finally formed sheets may be installed in frames for installation in the automobile.

Unless the edges of the cut glass sheets are seamed, the edges remain so sharp that operating personnel, such as those who install the ultimate product, others handling the sheets, or the ultimate purchasers, are likely to be cut. Seaming by moving an abrasive surface against the edges of the precut sheets has been found to eliminate the sharp edges. The present invention is concerned with improved apparatus for effecting such seaming, being so constructed and arranged to seam substantially, if not all, the entire peripheral edge of a glass sheet precut to any desired outline.

In a typical embodiment of the present invention an edge seaming apparatus is provided for use along a line for conveying precut glass sheets from a cutting station to a washing station. Such typical apparatus includes a support bridge angularly disposed above and across a horizontal conveyor normally employed for transporting the precut glass sheets along a predetermined path, a track connected to the bridge, a support slide movable along the track and fixed in position during operation, spaced first arms pivotably connected for rotation about vertical axes and extending horizontally above the conveyor, a second horizontally disposed arm pivoted to each first arm and each biased or resiliently urged inwardly toward the center of the conveyor, and an air motor carrying a diamond or other abrasive wheel connected to each of the second arms, the abrasive wheel being disposed in the plane of the glass as it moves along the conveyor and so contoured to embrace the edge of the glass. Stop means are provided for limiting the rotation of the first arms through a predetermined arc so that they move from one position to a second position. Also included are means responsive to the movement of the glass along its path to rotate the first arms from their first positions to their second positions, such means comprising hydraulic motors connected to each of the first arms for rotating the first arms and hydraulic means actuated by solenoids controlled by limit switches actuated by the moving glass sheet. If required, pinch rolls are employed for imparting a positive drive to the glass sheets and for maintaining them in their predetermined path of travel along the conveyor and through the seaming station.

A typical embodiment of the present invention will be described for purposes of illustration rather than limitation. In the drawings which form part of the description of this embodiment and wherein like reference characters refer to like structural elements:

Fig. 1 is a plan view of a typical edge seaming installation and its relation to a conveyor for transporting precut glass sheets from a cutting station to a washing station;

Fig. 2 is a partial sectional view taken through the bridge, and showing a first arm and an associated second arm extended together with details of the pivots and the air motor carrying the diamond abrasive wheel, the construction being the same for each pair of arms;

Fig. 3 is a schematic view of a typical hydraulic circuit for moving the first arms from a first to a second position; and Fig. 4 is a schematic view showing the travel of a precut glass sheet through the seaming apparatus of this invention and illustrating the arms in various positions during the seaming operation.

Referring to the drawings and in particular to Figs. 1 and 2, a horizontal conveyor 11 for transporting a sheet of glass G is supported on longitudinally extending horizontal beams 12 carried by a supporting structure from the floor (not shown). The conveyor 11 includes conveyor rolls 13 and, if necessary, pinch rolls (not shown). The conveyor rolls 13 are driven in a conventional manner by means of a motor (not shown). Pinch rolls if required are arranged in vertical relation to certain conveyor rolls 13 for the passage therebetween of the glass sheets.

A substantially horizontal bridge support 14 is supported by upright supports 15 and is arranged above and angularly transversely of the conveyor 13. As illustrated in Fig. 2, the bridge is preferably constructed of a tubular member 16 for rigidity and a connected angle 17, the angle 17 having an elongated, trapezoid cross-sectional track 18 attached thereto. As illustrated, the angle 17 is welded to the member 16 and the angle and track are shorter in length than the member 16, it being understood that all the lengths could be the same if necessary or desirable.

A support slide 20 embraces the track 18 and is movable on the track along its length, the slide 20 being constructed of a first member 21 of substantially U-shape in section and an elongated insert member 22 loosely bolted to the member 21. A plurality of positioning screws 23 threadably received within the lower arm of the member 21 engage the member 22 and by tightening the screws 23, the member 22 is wedged into engagement with the track 18, thereby fixedly positioning the slide support 20 in its desired position. The particular position of the slide support relative to the bridge 14 and the conveyor 11 is determined by the particular size and shape of the glass sheets being seamed.

A pair of spaced, substantially U-shaped members 24 are attached by machine screws to the support slide 20, the legs 25 and 26 of each member 24 being apertured to receive bearings 27 of the roller or ball variety. A vertically disposed pivot rod 28 is received within each pair of bearings 27 and extends above the leg 25 of the member 24, the rod being fixed in vertical position by a stop collar 30 adjacent the top bearing 27. A link 31 is connected to the pivot rod 28 adjacent its upper terminus.

A plate 32 is connected to the slide support 20 intermediate the U-shaped members 24 and hydraulic cylinders 33 and 34 are pivoted thereto, as at 35. The pistons (not shown) of the hydraulic cylinders 33 and 34 through their piston rods are pivotably connected as at 36 to the links 31, as illustrated in Fig. 1.

A tubular first arm 37 is connected by brackets 38 to each pivot rod 28 and each terminates in a substantially U-shaped member 40 having a vertical web portion 41.

The legs 42 and 43 of each member 40 are apertured to receive bearings 44, of the roller or ball variety. A vertically disposed pivot rod 45 is received within each pair of bearings 44 and is fixed in vertical position by a stop collar 46.

A tubular second arm 47 is connected by brackets 48 to each pivot rod 46 and each arm terminates in a mounting plate 50. An air motor 51, driven by a suitable source of air under pressure (not shown), is connected by a suitable bracket 52 to each mounting plate 50 and its shaft 53 carries an abrasive wheel 54, such as a diamond wheel. The abrasive wheel 54 is positioned on the shaft 53, to rotate in the plane of the glass as it is transported on the conveyor and to engage the peripheral edge of the glass G and its abrasive surface is contoured to embrace the edge of the glass. The air motor being conventional in construction requires no detailed description (only one being shown in Fig. 2).

A pair of stop members 55 and 56 are attached by machine screws to the upper leg 25 of each of the members 24 and a cooperating stop 57 is fixed, as by welding, to the tubular members 37. A stop member 58 is attached by machine screws to the upper leg 42 of each of the members 40 and a cooperating stop 60 is fixed, as by welding to the tubular members 47. A torsion spring 61 surrounds each pivot rod 45 and has one end suitably attached to the web 41 of each member 40 and the other end suitably attached to a bracket 48. The torsion spring 61 is arranged to resiliently urge the second arms inwardly toward the conveyor.

Looking again at Fig. 1, there is also shown a pair of spaced limit switches LS–1 and LS–2 disposed along the glass travel path and adapted to be energized by passage thereover of the glass G. In addition there is shown a stop element 62 extending horizontally over the conveyor, the stop element being constructed for horizontal position adjustment by sliding in its support 63 affixed to the conveyor rails 12.

Attention is now directed to Fig. 3 wherein there is illustrated a hydraulic system for actuation of a piston P of the cylinders 33. Each being identical in construction, the single system to be described is considered sufficient.

There is illustrated a cylinder 33 and its piston P, the piston rod is connected to a link 31 (see Fig. 1). Ports 64, 65 are provided at the extremities of the cylinder 33 and have connected thereto conduits 66 and 67, respectively, which terminate in connections to ports 68 and 70 in a valve housing 71, the housing also having opposing ports 72 and 73. Conduits 74 and 75 are connected to the ports 72 and 73 respectively, one conduit, for example 75, being connected to a source of fluid under pressure, such as a water line, and the other conduit, for example 74, being connected for discharge of fluid. A spool valve 76 is slidably received with the housing and is provided with parallel passages 77 and 78 and crossed but not intersecting passages 80 and 81. A solenoid S actuated by a limit switch, either LS–1 or LS–2, as the case may be, is provided for moving the spool 76 from its first position shown, where passage 80 connects ports 68 and 73 and passage 81 connects ports 70 and 72 to a second position where passage 77 connects ports 68 and 72 and passage 78 connects ports 70 and 73. A spring 82 connected to the spool 76 and to a fixed member 83 provides the force to return the spool 76 to its first position upon deenergization of the solenoid S. As will be readily understood, with the spool 76 in the position shown, the arms 37 will be in their Fig. 1 positions. Movement of the spool 76 to the left, as viewed in the drawings, against the force of the spring 82, connects the ports 68 and 72 and the ports 70 and 73, so that fluid flows to the port 65 and from the port 64 to discharge, thereby moving the piston P and moving the arms 37 to their second positions.

A description of a complete seaming operation will now be made and for this Fig. 4 will be considered together with the other figures for their details. For the purposes of this description, the parts will be referred to with respect to their relative positions shown on the drawings.

A precut sheet of glass, illustrated as having longitudinally extending somewhat pointed ends, is disposed on the conveyor 11, so that a line joining the longitudinal extremities is parallel to the conveyor rolls 13.

The glass G is transported along its predetermined path and its leading longitudinal extremity contacts the upper abrasive wheel 54 being driven by the air motor 51. As the glass G advances along its predetermined path, the abrasive wheel is resiliently urged into contact with a portion of the glass periphery because the arm 47 is, by means of the spring 61, resiliently urged inwardly toward the center of the conveyor 11 and the abrasive wheel 54 follows the outline of the glass G, the arm 47 moving outwardly of the conveyor 11, as illustrated in dotted lines in Fig. 4. As the glass G continues its travel on the conveyor 11, it depresses the limit switch LS–1 and thus energizes a solenoid S, which in turn moves a spool 76 from its initial position to its second position allowing fluid under pressure to move a piston P to thus turn the upper crank arm 31 and pivot rod 28, which in turn rotates the upper first arm 37 from its first position illustrated in Fig. 1 and by a solid heavy line in Fig. 4 wherein stops 55 and 57 are engaged, to its second position illustrated by a light solid line in Fig. 4 wherein stops 56 and 57 are engaged. The upper abrasive wheel 54 continues to engage and follow the contour of the glass G and is still resiliently urged into engagement therewith because of the spring 61 which exerts its force on the arm 47 in the same direction, i.e., toward the center of the conveyor, when the arm 37 is in both its first and second positions. The upper abrasive wheel 54 remains in contact with the glass G until the trailing longitudinal extremity has been seamed. The upper arm 37 remains in its second position until the glass G passes completely over the limit switch LS–1, after which the solenoid S is deenergized and the spring 82 returns the spool 76 to its initial position, reversing the direction of fluid flow to the cylinder 33 and thereby returning the arm 37 to its Fig. 1 illustrated first position.

While the upper abrasive wheel 54 is performing its seaming operation, the leading longitudinal extremity of the glass G engages the lower abrasive wheel 54 and the remainder of the glass G is seamed thereby, the operation of the lower arms 37 and 47 and limit switch LS–2 being the same as described with reference to their upper counterparts. As will be readily understood, each abrasive wheel seams only a portion of the edge; both abrasive wheels seam substantially, if not all, the glass edge.

The stop 62 prevents the arm 47 when in its second position and just after the lower abrasive wheel 54 leaves the glass G from swinging across the conveyor 11, such device not being required for the upper arm 47 in the illustrated embodiment because of its smaller length.

The bridge 16 is angled to the conveyor 11 to insure that there is no interference between the two abrasive wheels 54 when they initially contact the glass G. As previously stated, the particular contour of the glass dictates the length of the arm. For example, all arms 37 and/or 47 could be the same length, and such a construction would be applicable for seaming the edges of a rectangular sheet of glass. In this latter case, only one limit switch would be necessary and, likewise, only one hydraulic system for moving the arms 37 from their first to their second positions and then to their first positions would be required.

The contour of the glass also dictates the relative position of the slide support to the bridge, because, in order to seam the entire periphery of the glass, the seaming should begin at the leading longitudinal extremity of the glass. The abrasive wheels should contact the glass at such location, which may be in different positions transversely of the glass for other glass contours.

I claim:

1. Apparatus for edge seaming the peripheral edge of a precut flat glass sheet including a conveyor disposed to provide a predetermined path for transporting a precut flat glass sheet therealong, a seaming station comprising a support bridging said conveyor, at least one arm attached to said support for rotation about an axis angularly disposed with respect to said predetermined path, means to limit the rotation of said arm through a predetermined arc so that said arm moves from a first position to a second position, a second arm pivotably connected to said first-named arm, means to continually resiliently urge said second arm inwardly toward the center line of said predetermined path, an abrasive member connected to said second arm for engagement with the edge of a precut sheet of glass from its leading longitudinal extremity to its trailing longitudinal extremity, and means responsive to the movement of said glass on said conveyor and being operatively connected to said first-named arm for rotating said first-named arm from its first position to its second position to insure with said resilient means continued engagement of said abrasive member with the edge of said glass.

2. Apparatus as recited in claim 1, wherein said conveyor is disposed to transport said glass in a substantially horizontal plane and said axis of rotation is substantially vertical.

3. Apparatus as recited in claim 1, wherein said responsive means includes a limit switch in the path of said glass and actuated by said glass and a hydraulic system responsive to actuation of said limit switch to move said first-named arm from its first position to its second position.

4. Apparatus for edge seaming the peripheral edge of a precut flat glass sheet including a conveyor disposed to provide a predetermined path for transporting a precut flat glass sheet therealong, a seaming station comprising a support bridging said conveyor, a pair of arms attached to said support at spaced locations, each arm being attached to said support for rotation about axes angularly disposed with respect to said predetermined path and parallel to each other, means to limit the rotation of said arms through predetermined arcs so that each arm moves from a first position to a second position, a pair of second arms each pivotably connected to one of said first-named arms, means to continually resiliently urge said second arms inwardly toward the center line of said predetermined path, a pair of abrasive members each connected to one of said second arms for engagement with the edge of a precut sheet of glass from its leading longitudinal extremity to its trailing longitudinal extremity, said abrasive members each engaging a portion only of said edge and combining to engage substantially the entire edge, and means responsive to the movement of said glass on said conveyor and being operatively connected to said first-named arms for rotating said first-named arms from their first positions to their second positions to insure with said resilient means continued engagement of said abrasive members with said edge portions of said glass.

5. Apparatus as recited in claim 4 wherein said conveyor is disposed to transport said glass in a substantially horizontal plane, said axes of rotation are substantially vertical and said support is angled relative to said glass path to thereby avoid interference of said abrasive members.

6. Apparatus as recited in claim 5 wherein said abrasive members are diamond abrasive wheels and further including means for rotating said diamond abrasive wheels.

7. Apparatus as recited in claim 6 wherein said diamond abrasive wheels rotate in a substantially horizontal plane and are so contoured to embrace the edge of the glass.

8. Apparatus as recited in claim 6 wherein said means for rotating said diamond abrasive wheels comprises air motors.

9. Apparatus as recited in claim 4 wherein said responsive means includes a hydraulic system and means in the path of said glass to actuate said hydraulic system to provide rotation of said first-named arms.

10. Apparatus for edge seaming the peripheral edge of a precut flat glass sheet including a horizontal conveyor for transporting a precut flat glass sheet along a predetermined horizontal path, a seaming station comprising a bridge support positioned angularly transversely and above said conveyor, a support slidable along said bridge and adapted to be fixed in a desired position therealong, spaced horizontally disposed arms attached to said support for rotation about axes perpendicular to said conveyor, stop means to limit the rotation of said arms through predetermined arcs so that each arm moves from a first position to a second position, a horizontally disposed second arm connected to each of said first-named arms for pivotable movement about vertical axes, a torsion spring at each pivotable connection between a first-named arm and a second arm to continually resiliently urge each second arm inwardly toward the center line of said conveyor, an abrasive means positioned in the horizontal plane of said glass connected to the terminus of each second arm for engagement with the edge of said glass from its leading longitudinal extremity to its trailing longitudinal extremity, each abrasive means seaming a different portion of said glass edge and combining with each other to seam substantially the entire edge, a hydraulic means connected to said first-named arms for rotating said first-named arms from their first positions to their second positions to insure with said torsion springs continued engagement of said abrasive means with the edge of said glass, and means in the path of said glass and operatively associated with said hydraulic means for actuating said hydraulic means to cause said rotation of said first-named arms.

11. Apparatus as recited in claim 10 wherein said hydraulic means includes a pair of cylinders, a source of fluid under pressure connected to said cylinders, a piston within each said cylinder connected to one of said first-named arms, a spool valve between said source of fluid and each cylinder, and means to move said spool valve from one position to another position to allow a flow of fluid to move said piston and thereby rotate said first-named arms.

12. Apparatus as recited in claim 11, wherein said means in the path of said glass includes at least one limit switch and said means to move said spool valve includes a solenoid, said solenoid being actuated by said limit switch in response to passage of glass thereover and in contact therewith during its movement on said conveyor.

References Cited in the file of this patent

UNITED STATES PATENTS

| | | |
|---|---|---|
| 2,296,934 | Kirkman et al. | Sept. 29, 1942 |
| 2,299,850 | Schafer | Oct. 27, 1942 |
| 2,418,737 | Talboys | Apr. 8, 1947 |
| 2,723,598 | Mann | Nov. 15, 1955 |